(12) United States Patent
Kumar et al.

(10) Patent No.: US 11,478,999 B2
(45) Date of Patent: Oct. 25, 2022

(54) PULTRUSION PROCESS OF FORMING MULTI-LAYERED STRUCTURES OF DISSIMILAR MATERIALS USING A MULTI-DIE PULTRUSION DEVICE

(71) Applicant: BASF SE, Ludwigshafen am Rhein (DE)

(72) Inventors: Anil Kumar, Wyandotte, MI (US); Matthew Frank Parkinson, Wyandotte, MI (US); Elias Ruda Shakour, Wyandotte, MI (US); Sergio Franyutti, Wyandotte, MI (US)

(73) Assignee: BASF SE, Ludwigshafen am Rhein (DE)

( * ) Notice: Subject to any disclaimer, the term of this patent is extended or adjusted under 35 U.S.C. 154(b) by 254 days.

(21) Appl. No.: 16/760,567

(22) PCT Filed: Oct. 29, 2018

(86) PCT No.: PCT/US2018/058014
§ 371 (c)(1),
(2) Date: Apr. 30, 2020

(87) PCT Pub. No.: WO2019/089463
PCT Pub. Date: May 9, 2019

(65) Prior Publication Data
US 2020/0338841 A1    Oct. 29, 2020

Related U.S. Application Data
(60) Provisional application No. 62/579,378, filed on Oct. 31, 2017.

(51) Int. Cl.
*B29C 70/52* (2006.01)
*B29C 70/50* (2006.01)

(52) U.S. Cl.
CPC .......... *B29C 70/521* (2013.01); *B29C 70/502* (2013.01); *B29C 70/527* (2013.01); *B29C 70/528* (2013.01)

(58) Field of Classification Search
CPC ... B29C 70/521; B29C 70/502; B29C 70/527; B29C 70/528; B29C 70/523; B29C 70/526
See application file for complete search history.

(56) References Cited

U.S. PATENT DOCUMENTS

| | | | |
|---|---|---|---|
| 5,176,865 A | * | 1/1993 | Beall ................. B29C 70/523 427/434.6 |
| 5,492,583 A | | 2/1996 | Fingerson et al. |

(Continued)

FOREIGN PATENT DOCUMENTS

| | | |
|---|---|---|
| CN | 102947078 A | 2/2013 |
| DE | 19882262 T1 | 3/2000 |

(Continued)

OTHER PUBLICATIONS

First Office Action from corresponding Chinese Patent Appln, No. 201880070987.0 dated Sep. 24, 2021, and its English translation.

(Continued)

*Primary Examiner* — Matthew J Daniels
(74) *Attorney, Agent, or Firm* — DLA Piper LLP (US)

(57) ABSTRACT

A method for forming a multi-layered structure includes forming a resin-infused fibrous material (70) by applying a liquid resin component (60) onto the fibrous material (32) being pulled through an injection box (110) such that the fibrous material is partially impregnated and surrounded by the liquid resin component to form a resin-infused fibrous material. The resin-infused fibrous material is then introduced to a first die (130) and partially cured to form a partially-cured fiber-reinforced core material (80). The core material exits the first die to an intermediate region, where (Continued)

a polymer layer (40) is then applied onto at least a portion of the outer profile surface of the core material. The material then enters a second die (140), where the liquid resin component is fully cured to form a fiber-reinforced thermoset core material (30) having the polymer layer adhered thereon within the second die, thus forming the multi-layered structure (20).

14 Claims, 3 Drawing Sheets

(56) References Cited

U.S. PATENT DOCUMENTS

| | | | | |
|---|---|---|---|---|
| 5,747,075 | A | * | 5/1998 | Gauchel ............... B29C 70/525 156/433 |
| 5,783,013 | A | * | 7/1998 | Beckman .............. B29C 70/523 156/433 |
| 2007/0116941 | A1 | * | 5/2007 | Brown .................... C08L 75/04 156/166 |
| 2017/0232691 | A1 | * | 8/2017 | Markowski ............. B32B 5/267 442/401 |

FOREIGN PATENT DOCUMENTS

| | | |
|---|---|---|
| EP | 0542709 A | 5/1993 |
| WO | 2005/040017 A2 | 5/2005 |
| WO | 2011/163349 A2 | 12/2011 |

OTHER PUBLICATIONS

International Preliminary Report on Patentability from counterpart International Application No. PCT/US2018/058014 dated May 14, 2020.

International Search Report and Written Opinion from counterpart International Application No. PCT/US2018/058014 dated Apr. 17, 2019.

* cited by examiner

PULTRUSION PROCESS OF FORMING MULTI-LAYERED STRUCTURES OF DISSIMILAR MATERIALS USING A MULTI-DIE PULTRUSION DEVICE

BACKGROUND OF THE INVENTION

1. Field of the Invention

The subject invention relates generally to a pultrusion process for forming multi-layered structures of dissimilar materials, and more particularly to a pultrusion process for forming a multi-layered structure of dissimilar materials using a multi-die pultrusion device

2. Description of the Related Art

Various manufacturing methods are available to make multi-layered structures of dissimilar materials such as metals, thermoset plastics, thermoplastics, adhesives, tie layers, coatings, etc. These manufacturing methods include, but are not limited to, pultrusion, extrusion, co-extrusion, encapsulation, coating, and metal forming. The resultant multi-layered structures from the various process can be formed in a variety of geometric designs such as multi-layer tubes, rods, columns, I-beams, and the like.

In a standard pultrusion process, reinforcement materials such as fibers or woven or braided strands are impregnated with resin, possibly followed by a separate preforming system, and pulled through a heated stationary die where the resin undergoes polymerization to form a thermosetting resin having a desired outer profile (i.e., geographic shape), otherwise known as a pultruded substrate. The impregnation is either done by pulling the reinforcement materials through a bath or by injecting the resin into an injection chamber and onto the reinforcement materials which typically is connected to the die.

In certain applications, the pultruded substrate, after being removed from the die, is further processed to include the application of an additional layer, or additional layers, of a polymeric material to form a multi-layered structure, typically by spraying or similar coating process. The application of such additional layers can provide the pultruded substrate with enhanced properties such as mechanical performance, chemical resistance, ultraviolet light resistance, desired electrical properties, or enhanced aesthetic appearance. Such additional layers can are typically applied after the pultruded substrate exits the die of the pultruder via a coating process or the like.

The subject invention provides an alternative method for forming a multi-layer structure via a modified pultrusion process.

SUMMARY OF THE INVENTION

In one embodiment of the subject invention, a method for forming a multi-layered structure using a modified pultrusion process is provided. Accordingly, in this embodiment, a method for forming a multi-layered structure comprises:
  pulling a fibrous material consecutively through an injection box, an optional cooling box, a first die, and a second die of a multi-die pultrusion device, wherein the first die and the second die are separated by an intermediate region;
  forming a resin-infused fibrous material by introducing a liquid resin component onto the fibrous material within the injection box such that the fibrous material is at least partially impregnated with and at least partially surrounded by the liquid resin component;
  forming a partially-cured fiber-reinforced core material by heating the resin-infused fibrous material to a first temperature and for a first time sufficient to partially cure the liquid resin component within the first die of the multi-die pultrusion device;
  shaping the partially-cured fiber-reinforced core material to an outer profile shape while removing the partially-cured fiber-reinforced core material from the first die by pulling the partially-cured fiber-reinforced core material through a die opening in the first die and into the intermediate region between the first die and the second die;
  applying one or more layers of a polymer material onto at least a portion of the outer profile surface of the partially-cured fiber-reinforced core material within the intermediate region between the first die and the second die; and
  introducing the partially-cured fiber-reinforced core material having the applied one or more layers into the second die and heating the partially-cured fiber-reinforced core material having the applied one or more layers to a second temperature and for a second time sufficient to substantially cure the liquid resin component and form a fiber-reinforced thermoset core material, wherein one of the applied one or more layers is adhered onto an outer surface of the fiber-reinforced thermoset core material, thereby forming the multi-layered structure.

The method of the subject invention offers advantages over prior art systems in terms of ease of manufacturing and in the ability to easily and quickly change mechanical or chemical characteristics of the formed Other features and advantages of the subject invention will be readily appreciated, as the same becomes better understood, after reading the subsequent description taken in conjunction with the accompanying drawings.

DETAILED DESCRIPTION OF THE PREFERRED EMBODIMENT(S)

Referring to the figures, wherein like numerals indicate like parts throughout the several views, the subject invention is directed to a multi-stage pultrusion system 100 that is used to form multi-layered structures 20 of dissimilar materials.

Figure 1:
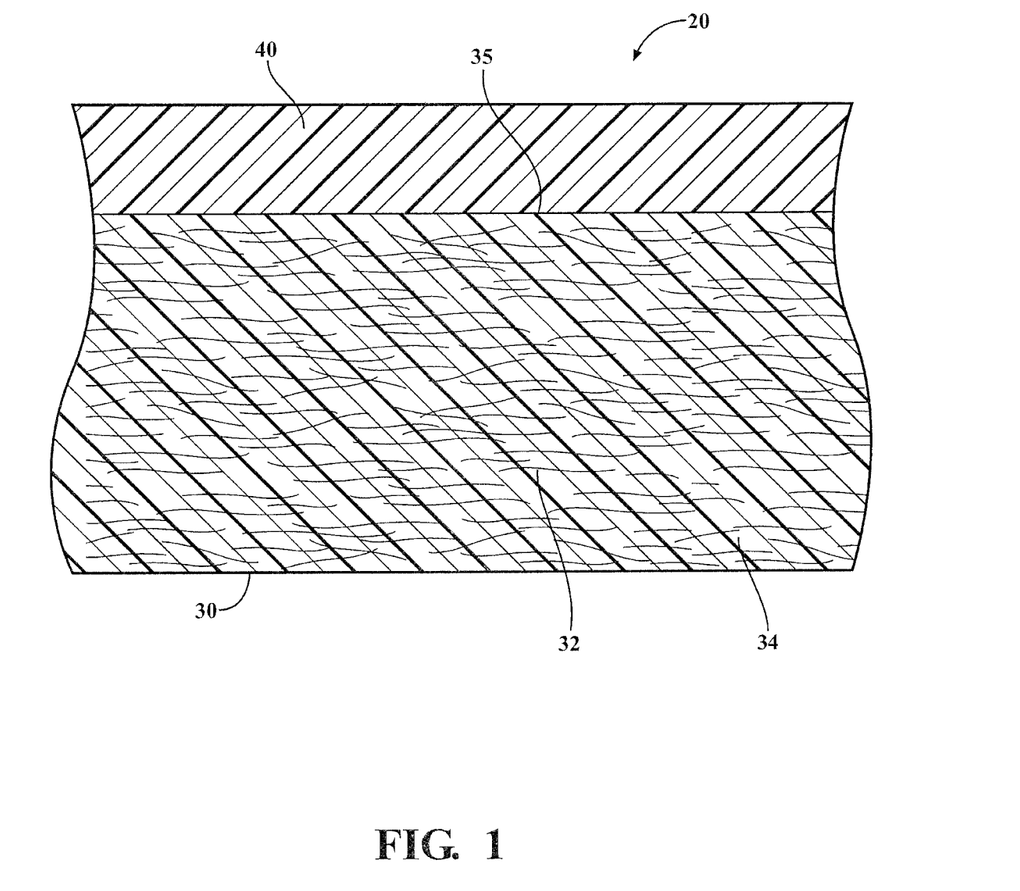
FIG. 1 illustrates a multi-layered structure formed in accordance with the method of the subject invention.

As best shown in FIG. 1, the multi-layered structure 20, in one exemplary embodiment, includes a fiber-reinforced thermoset core material 30 having an outer surface 35. and a polymer layer 40 adhered onto, and preferably bonded to, the outer surface 35 of the core material 30.

The fiber-reinforced thermoset core material 30, in certain embodiments, includes a fibrous material 32 and a thermoset material 34, in which the thermoset material 34 surrounds and coats the fibrous material 32 to form a composite.

The fibrous material 32, in certain embodiments, is in the form a continuous fiber or a fiber mat. Typical reinforcements used are fiberglass roving, continuous strand mat, woven, non-woven and stitched fabrics. Exemplary fibers that can be used as the fibrous material 32 include, but are not limited to, synthetic and natural fibers having a desired stiffness. Exemplary high stiffness synthetic fibers that can be used as the fibrous material 32 include, but are not limited to, glass, carbon, graphite, aramid, steel, carbon nanotubes and blends thereof. Exemplary natural fibers that may also be included include hemp, bamboo, or flax. In certain embodiments, glass fibers, including treated or untreated glass fibers, are utilized.

The fiber-reinforced thermoset core material 30, in certain embodiments, is formed from a liquid resin component (shown as 60 in FIG. 2), that impregnates and coats the fibrous material 32 and is subsequently cured to form the thermoset material 34. Accordingly, the liquid resin component 60 may alternatively be referred to as a thermosetting resin 60 that cures to form a thermoset material 34. In the exemplary embodiments described herein, the thermosetting resin 60 includes, as its reaction components used to form a thermoset polyurethane, an isocyanate component and an isocyanate-reactive component, as will be discussed in further detail below. Alternatively, other standard thermosetting resins 60 that cure to form thermoset materials 34 can be used, including thermosetting resins 60 having components that cure to form thermoset polyesters, thermoset vinyl esters, thermoset epoxies, and/or thermoset phenolics.

As noted above, the fiber-reinforced thermoset core material 30, in certain embodiments, is a thermoset polyurethane material 34 that is formed by curing a thermosetting resin 60 that includes, as its reactive components, an isocyanate-reactive component and an isocyanate component.

The isocyanate-reactive component is preferably a polymer that includes one or more hydroxyl groups (OH-functional groups), or more commonly referred to as a hydroxyl-functional polymer. The isocyanate component is a polymer that includes one or more isocyanate groups (NCO groups) that react with the hydroxyl groups to form carbamate (i.e. urethane) links.

In certain embodiments, the hydroxyl-functional polymer is a hydroxyl-functional polyether (i.e., hydroxyl-functional polyether-group containing polymers), while in other embodiments the hydroxyl-functional polymer is a hydroxyl-functional polyester (i.e., hydroxyl-functional polyester-group containing polymers). In yet other embodiments, the isocyanate-reactive component hydroxyl-functional polymer can be a mixture of a hydroxyl-functional polyether and a hydroxyl-functional polyester.

The hydroxyl-functional polyether used as one of the reactants in forming the fiber-reinforced core material of the subject invention are polyether polymers that include one or more hydroxyl-functional groups, typically at least two OH-functional groups. Accordingly, the hydroxyl-functional polyether are polyether polymers having one OH-functional group (i.e., a polyether monol), two OH-functional groups (i.e., a polyether diol), three OH-functional groups (i.e., a polyether triol), four OH-functional groups (i.e., a polyether tetrol), polyether-group containing polymers having more than four OH-functional groups, and combinations thereof. The hydroxyl functionality of these hydroxyl-functional polyethers is typically expressed in terms of an average functionality of all of the respective polymer chains present in the collective hydroxyl-functional polyether blend.

Hydroxyl-functional polyethers having an average of two or more OH-functional groups per molecule are sometimes alternatively referred to as polyether polyols, which are typically formed as the polymeric reaction product of an organic oxide and an initiator compound containing two or more active hydrogen atoms. The active hydrogen compound in the presence of a base catalyst initiates ring opening and oxide addition, which is continued until the desired molecular weight is obtained. If the initiator has two active hydrogens, a diol results. If a trifunctional initiator such as glycerine is used, the oxide addition produce chain growth in three directions, and a triol results.

The hydroxyl-functional polyether can be any type of hydroxyl-functional polyether known in the art. The hydroxyl-functional polyether can be non-ethoxylated or ethoxylated. In addition, the hydroxyl-functional polyether can be short chain, low molecular weight hydroxyl-functional polyether having one or more OH-functional groups.

Particularly suitable hydroxyl-functional polyether or polyethers for use in the polyurethanes include, but are not limited to, products obtained by the polymerization of a cyclic oxide, for example ethylene oxide (EO), propylene oxide (PO), butylene oxide (BO), or tetrahydrofuran in the presence of initiator compounds having one or more active hydrogen atoms. Suitable initiator compounds including a plurality of active hydrogen atoms for use in obtaining hydroxyl-functional polyethers include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable hydroxyl-functional polyether or polyethers include polyether diols and triols, such as polyoxypropylene diols and triols and poly(oxyethylene-oxypropylene)diols and triols obtained by the simultaneous or sequential addition of ethylene and propylene oxides to di- or tri-functional initiators. Copolymers having oxyethylene contents of from about 5 to about 90% by weight, based on the weight of the polyether polyol component, of which the polyether polyols may be block copolymers, random/block copolymers or random copolymers, can also be used. Yet other suitable hydroxyl-functional polyethers include polytetramethylene ether glycols obtained by the polymerization of tetrahydrofuran.

Suitable non-limiting commercial hydroxyl-functional polyether or polyethers having an average of two OH-functional groups per molecule, sometimes referred to as polyether diols, for use in the subject invention include Pluracol® P410R, 1010, 2010, 1062, and 1044, each commercially available from BASF Corporation of Florham Park, N.J. Suitable non-limiting commercial hydroxyl-functional polyether or polyethers having an average of three OH-functional groups per molecule, sometimes referred to as polyether triols, for use in the subject invention include Pluracol® GP430, GP730, 4156, 2090, and 816, each commercially available from BASF Corporation of Florham Park, N.J. Suitable non-limiting commercial hydroxyl-functional polyether or polyethers having an average of four OH-functional groups per molecule, sometimes referred to as polyether tetrols include Pluracol® 735, 736 and PEP 500 and Quadrol, each commercially available from BASF Corporation of Florham Park, N.J. One suitable non-limiting commercial higher hydroxyl-functional polyether for use in the subject invention is Pluracol® SG360 (based on sucrose and glycerin), commercially available from BASF Corporation of Florham Park, N.J.

In certain embodiments, a combination of two or more hydroxyl-functional polyethers for use in the subject invention can be used, with each one of the two or more hydroxyl-functional polyethers having the same or a different weight average molecular weight within the range of 180 to 6,500 g/mol described above.

In certain embodiments, in addition or in place of the hydroxyl-functional polyether, the isocyanate-reactive component may by in the form of another hydroxyl-functional polymer, including but not limited to hydroxyl-functional polyesters. Suitable hydroxyl-functional polyesters, include, for example polyester polyols such as, but are not limited to, aromatic polyester polyols, hydroxyl-terminated reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters sebacic acid, phthalic anhydride, tetrachlorophthalic anhydride or dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used.

The isocyanate-reactive component may also include one or more catalysts. The catalyst is typically present in the isocyanate-reactive component to catalyze the reaction between the isocyanate component and the isocyanate-reactive component. That is, isocyanate-reactive component typically includes a "polyurethane catalyst" which catalyzes the reaction between an isocyanate and a hydroxy functional group. It is to be appreciated that the catalyst is typically not consumed in the exothermic reaction between the isocyanate and the polyol. More specifically, the catalyst typically participates in, but is not consumed in, the exothermic reaction. The catalyst may include any suitable catalyst or mixtures of catalysts known in the art. Examples of suitable catalysts include, but are not limited to, gelation catalysts, e.g., amine catalysts in dipropylene glycol; blowing catalysts, e.g., bis(dimethylaminoethyl)ether in dipropylene glycol; and metal catalysts, e.g., organo-tin compounds, organo-bismuth compounds, organo-lead compounds, etc.

The isocyanate catalyst can be utilized in various amounts. For example, in various embodiments, the isocyanate catalyst is utilized in an amount of from 0.0001 to 10, from 0.0001 to 5, from 5 to 10, weight percent based on a total weight percent of reactants or the isocyanate or any other value or range of values therebetween. Typically, an amount of catalyst used depends on a temperature of the process. For example, at 150° F. (about 65.5° C.), 0.0001% may be utilized, while at room temperature 0.001 to 10%, such as 5-10%, such as 0.001 to 1%, may be utilized.

The isocyanate-reactive component may also include various additional additives. Suitable additives include, but are not limited to, anti-foaming agents, processing additives, plasticizers, chain terminators, surface-active agents, flame retardants, anti-oxidants, water scavengers, fumed silicas, dyes or pigments, ultraviolet light stabilizers, fillers, thixotropic agents, silicones, amines, transition metals, and combinations thereof. The additive may be included in any amount as desired by those of skill in the art. For example, a pigment additive allows the polyurethane elastomer composition to be visually evaluated for thickness and integrity and can provide various marketing advantages.

As also noted above, the thermosetting resin 60 for forming the thermoset material 34 of the subject invention also includes an isocyanate component as one of its reactants. The isocyanate component typically has an average functionality of from about 1.5 to about 3.0. The isocyanate component also typically has an NCO content varying from a few weight percent to around 50 weight percent, depending upon the isocyanate component utilized.

Suitable isocyanates for use in the isocyanate component include, but are not limited to, aromatic or aliphatic isocyanate-group containing compounds such as methylene diphenyl diisocyanate (MDI), polymethylene polyphenylisocyanate (PMDI), hexamethylene diisocyanate (HDI), an isocyanate-terminated prepolymer, a carbodiimide polymer having unreacted isocyanate groups (i.e., free (pendent) NCO groups), and any combinations thereof. The isocyanate-terminated prepolymer, when present in the isocyanate component, is generally the reaction product of an isocyanate and an active hydrogen-containing species and is formed by various methods understood by those skilled in the art or can be obtained commercially from a manufacturer, a supplier, etc.

As noted above, the multi-layered structure 20 also includes a polymer layer 40 that is adhered to, and preferably bonded to, the outer surface 35 of the fiber-reinforced thermoset core material 30. The polymer layer 40, in certain embodiments, is a thermoplastic material that provides desired physical and aesthetic properties to the multi-layered structure 20.

In certain embodiments, the polymer layer 40 is a single layer, while in other embodiments the polymer layer 40 can include more than one layer applied sequentially to the outer surface 35 of the fiber-reinforced thermoset core material 30. In certain embodiments, each additional layer 40A is of the same composition as the previous layer 40A, while in still further embodiments the additional layers 40A may be formed of polymers of varying compositions to provide the multi-layered structure 20 with unique physical properties. In certain embodiments, the polymer film layer 40 is a polymer film, defined generally as having a thickness of 10 mils or less.

Suitable polymer materials used to form the one or more polymer layers 40 that include, but are not limited to, polybutylene terephthalate (PBT), polyethylene terephthalate (PET), thermoplastic polyurethane (TPU), ethylene vinyl acetate (EVA), polyvinyl chloride (PVC), polyester, and acrylonitrile styrene acrylate (ASA), and any combination thereof in embodiments wherein the polymer layer 40 is more than one layer 40 sequentially applied (and wherein the sequential layers 40 are formed from different materials). Such polymer layers 40 can provide the multi-layered structure 20 with desired mechanical and physical properties, including ultraviolet light (UV light) resistance, flame resistance, and hydrolysis resistance. Further, the polymer layer 40 may provide a desired opacity or transparency to the multi-layered structure 20, alone or in conjunction with providing the structure 20 with a desired color or outer appearance.

In certain embodiments, the polymer layer 40 is preformed or provided in commercially available forms as a sheet. Alternatively, the polymer layer 40 can be produced and applied onto the partially-cured fibrous material (shown as 80 in FIG. 3) in a single manufacturing step.

By way of example, in certain embodiments, the polymer layer 40 may be a TPU layer, which provides enhanced wear resistance to the multi-layered structure 20. Further, the TPU layer 40 has increased adhesion to the fiber-reinforced core material 30. Suitable hydroxyl-functional polymers that can be used to form the TPU layer can be based on one or more of the hydroxyl functional polyethers and/or polyesters as described above. In addition, suitable isocyanates that can be used in forming the TPU films can be based on aromatics isocyanates and aliphatic isocyanates, including those described above, such as MDI.

By way of another example, in certain embodiments, the polymer layer 40 may be an EVA layer, which provides enhanced ultraviolet light stability to the multi-layered structure 20.

By way of yet another example, in certain embodiments, the polymer layer 40 may be an PVC layer, which provides enhanced ultraviolet light stability and flame retardance to the multi-layered structure 20.

In still another example, in certain embodiments, the polymer layer 40 may be an colored ASA layer, which provides UV light stability and color to the outer layer.

In still another example, in certain embodiments, the polymer layer 40 may be an PET or PBT layer, which provides UV stability and hydrolysis resistance and well as other desired mechanical properties.

Further, in certain embodiments, the compositions used to form such polymer layers 40 may include additives, in addition to the polymeric component, that provide the polymer layers 40 with enhanced properties beyond what is provided by the polymeric component, including enhanced UV resistance, flame resistance, or hydrolysis resistance.

For example, in certain embodiments, a hydrolysis resistance additive may be added to the PET or PBT materials used to form the polymer layer or layers 40 with enhanced hydrolysis stability as compared to PET or PBT layers without such an additive.

Still further, in other embodiments, a UV stabilizer, such as Tinuvin® 1600, may be added to the PET or PBT compositions used to form the PET/PBT layer 40 to provide enhanced ultraviolet light resistance as compared to PET or PBT layers without such an additive.

Still further, in other embodiments, titanium dioxide may be included in the polymer composition used to form the one or more polymer layers 40 to provide the polymer layer or layers 40 with opacity, a white color and enhanced UV resistance.

Figure 2:
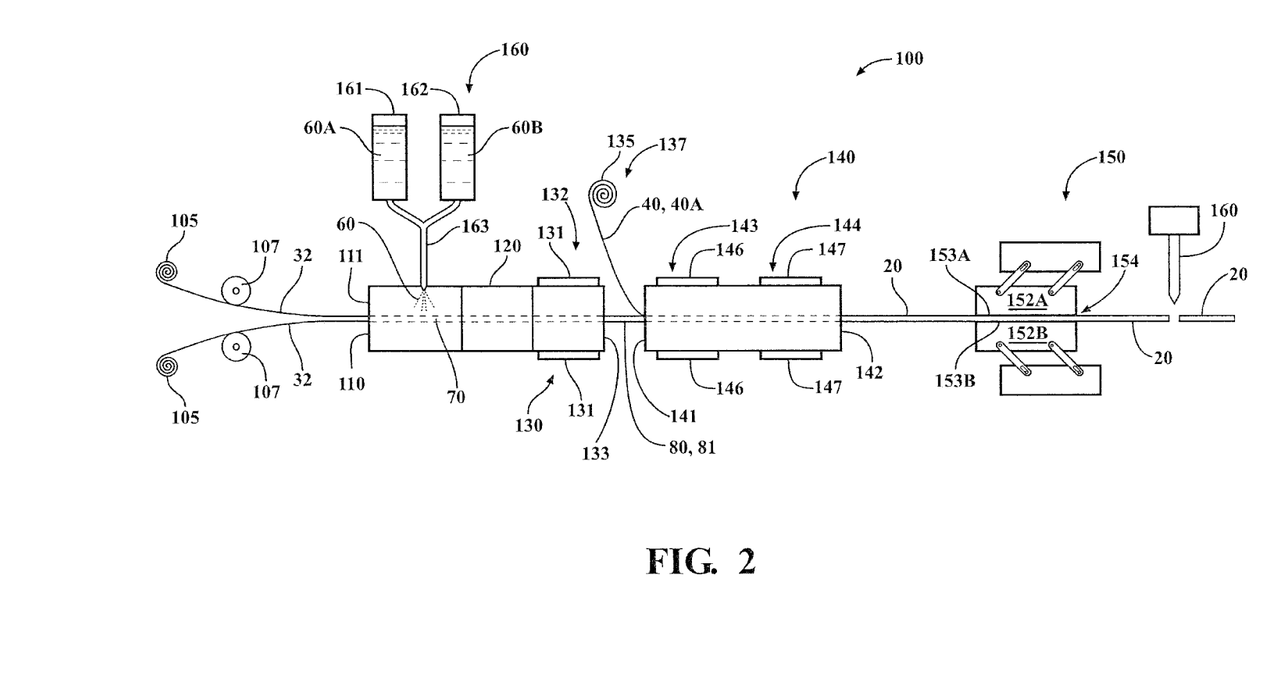
FIG. 2 is a perspective view of the multi-die pultrusion device in accordance with the subject invention.

The multi-layered structure 20 of the subject invention, in certain embodiments as described above, is formed in a multi-die pultrusion device 100, as shown best in FIG. 2. The device 100 includes, as its major components, one or more fibrous material rollers 105, an injection box 110 coupled to a feed system 160, an optional cooling box 120, a first die 130, one or more polymer layer rollers 135, a second die 140, a puller 150, and a cutting device 160.

The one or more fibrous material rollers 105, as the name implies, includes the fibrous material 32 that is unrolled due to the pulling action from the puller 150. In certain embodiments, a single roller 105 is used, and hence a single layer of fibrous material 32 is unrolled and introduced into the injection box 100. Alternatively, multiple rollers 105 are utilized (shown in FIG. 2 as two rollers 105), and hence two or more layers of the fibrous material 32 is unrolled and introduced into the injection box 100. In certain embodiments, a tensioner 107 is included which maintains tension on the fibrous material 32 as it is unrolled.

The feed system 160 can include one or more systems (here shown as two storage vessels 161 and 162) to store and feed a liquid resin component 60 onto the fibrous material 32 within the injection box 110 in such a manner such that the fibrous material 32 is at least partially impregnated with and at least partially surrounded by the liquid resin component 60.

As illustrated in FIG. 2, a first portion 60A of the liquid resin component 60 is stored in the first storage vessel 161, while a second portion 60B of the liquid resin component 60 is stored in the second storage vessel 162.

The feed system 160 can also include an injector mechanism 163 that is used in conjunction with the first and second storage vessels 161, 162. When utilized, the first portion 60A and second portion 60B of the liquid resin component 60 are introduced from the respective first and second storage vessels 161, 162 into the injector mechanism, where they are premixed and subsequently injected as the single liquid resin component 60 onto the fibrous material 32 within the first injector box 110, as will be described further below. Preferably, the liquid resin component is injected at a viscosity ranging from 50 to 500 centipoise (as measured at 25° C. in accordance with ASTM 2196), such as 100 to 250 centipoise, such as 150 centipoise.

As provided immediately above, reference to the viscosity of the liquid resin component, or any further viscosity referenced herein, refers to viscosity of the particular component as measured at 25° C. in accordance with the method of ASTM standard D2196-15 on a Brookfield-type rotational viscometer, with such measurements expressed in units a centipoise (cP, with one cP equal to one millipascal-second (mPa·s)). For ease of description, the measurement may be more simply described as ASTM standard D2196.

In embodiments wherein the liquid resin component 60 forms a thermosetting urethane material 34 from the isocyanate component and isocyanate-reactive component, as described in any embodiment above, the first storage vessel 161 stores the isocyanate component (i.e., the first portion 60A of the liquid resin component 60), while the second storage vessel 162 stores the isocyanate-reactive component (i.e., the second portion 60B of the liquid resin component 60). Accordingly, the separate storage vessels 161, 162 prevent the premature reaction of the isocyanate-functional groups of the isocyanate component with the hydroxyl-functional groups of the isocyanate-reactive component prior to being mixed in the injection mechanism 163.

The injection box 110 is an enclosed structure having an entrance opening 111 for introduction of the fibrous material 32 (shown on the left side of the injection box 110 in FIG. 2) and an opening coupled to the feed system 160 for introduction of the liquid resin component 60 onto the fibrous material 32 to form a resin-infused fibrous material 70, as will be described in further detail below.

The cooling box 120, when present, is an enclosure that transports the resin-infused fibrous material 70 from the injection box 110 to the first die 130. In certain embodiments, the cooling box 120 is an extension of the injection box 110 (i.e., a single enclosure that includes both the injection box 110 and cooling box 120), and corresponds to portions of the injection box 110 wherein the liquid resin component 60 is not being introduced onto the fibrous material 32. Alternatively, the cooling box 120 is a separate enclosure from the injection box 110, and thus includes a separate entrance opening and exit opening (not shown), and wherein the injection box 110 also includes an exit opening (also not shown).

The first die 130, in certain embodiments, includes one or more heating platens 131 that function to heat a first zone 132 of the first die 130 to a desired temperature. In further embodiments (not shown), additional zones (with associated additional heating platens) may be included in the first die 130.

The first die 130 also includes an exit opening 133 that is shaped to a desired outer profile shape. Accordingly, within the first die 130, the resin-infused fibrous material 70 is heated to a first temperature sufficient and for a first time sufficient to partially cure the liquid resin component 60 of the fiber-reinforced fibrous material 70 within the first die 130 of the multi-die pultrusion device and form a partially-cured fibrous material 80. As will also be described further, the partially-cured fibrous material 80 is then shaped to a desired outer profile shape 81 as it is pulled through the exit opening 133.

In certain embodiments, the first die 130 is an extension of the cooling box 120, if present and/or is an extension of the injection box 110 (if the cooling box 120 is not present). Alternatively, the first die 130 is a separate enclosure distinct from the injection box 110 and cooling box 120, and thus includes a separate entrance opening (not shown).

The one or more polymer layer rollers 135, as the name implies, each include a single layer 40A of the polymer layer 40 that is unrolled and applied to an outer surface of the outer profile shape 81 of the partially-cured fibrous material 80 in an intermediate region 137 located between the first die 130 and the second die 140. In certain embodiments, such as shown in FIG. 2, a single polymer layer roller 135 is utilized, and hence a single layer 40A of the polymer layer 40 is applied to an outer surface of the outer profile shape 81 of the partially-cured fibrous material 80. In alternative embodiments, two or more polymer layer rollers 135 are utilized, and hence two or more layers 40A of polymer layer 40 are applied to an outer surface of the outer profile shape 81 of the partially-cured fibrous material 80. Each of the polymer layers 40A, as noted above, may be of the same composition or differing composition, depending upon the desired attributes and performance characteristics of the polymer layer 40 in general, and the multi-layered structure 20 in particular, as desired.

The second die 140, in certain embodiments, includes an entrance opening 141 for receiving the partially-cured fibrous material 80 having the polymer layer 40 applied thereon and an exit opening 142 that is shaped to a desired outer profile shape for removing the multi-layered structure 20 from the second die 140.

The second die 140, in certain embodiments, includes a first zone 143 and a second zone 144 distinct from the first zone 143. The first zone 143 and the second zone 144, respectively, each include one or more heating platens 146, 147 that function to heat the first zone 143 and the second zone 144 to a desired temperature. In further embodiments (not shown), additional zones (with associated additional heating platens) may be included in the second die 140.

Accordingly, within the second die 140, the partially-cured fibrous material 80 having the applied polymer layer 40 is heated to a second temperature and for a second time sufficient to substantially cure the liquid resin component 60 into the thermoset urethane material 34 and thus form the fiber-reinforced thermoset core material 30, wherein the applied polymer layer 40 is adhered onto an outer surface 35 of the fiber-reinforced thermoset core material 30, thereby forming the multi-layered structure 20. As will also be described further, the multi-layered structure 20 may then shaped to a desired outer profile shape it is pulled through the exit opening 142.

The puller 150 includes a pair of rollers 152A and 152B having respective inner surfaces 153A, 153B which define a gap 154 therebetween. The fibrous material 32 is fed through the gap 154, with its upper and lower surfaces pressed against the respective inner surfaces 153A, 153B of the rollers 152A, 152B within the gap 154.

The cutting device 160, as the name implies, functions to cut the formed multi-layered structure 20 to desired lengths. The cutting device 160 may take the form of a saw, or a cutting blade, or any other type of cutting device contemplated by those of ordinary skill in the composite arts.

Figure 3:
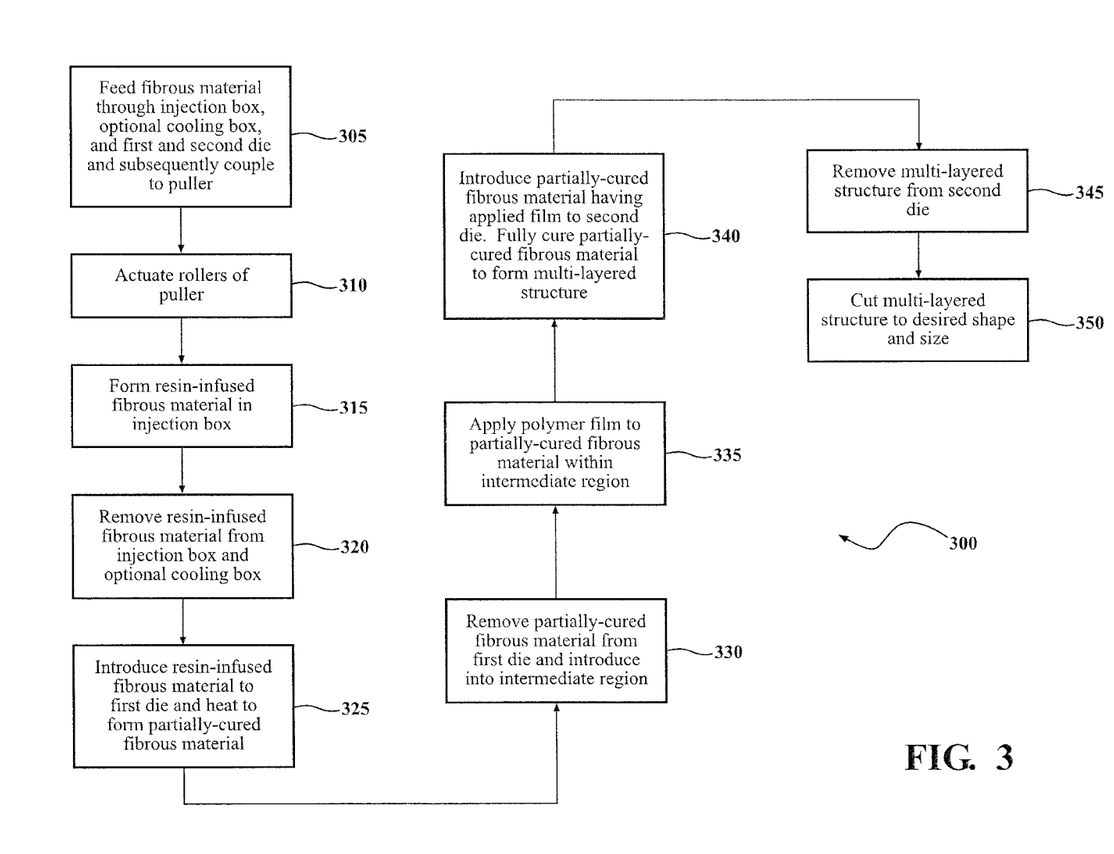
FIG. 3 is a logic flow diagram for forming the multi-layered structure of FIG. 1 in the multi-die pultrusion device of FIG. 2.

The process for forming the multi-layered structure 20 of FIG. 1, utilizing the multi-die pultrusion device 100 of FIG. 2, is illustrated in the logic flow diagram 300 of FIG. 3.

The process begins in Step 305, wherein the fibrous material 32 is unrolled from the one or more fibrous material rollers 105 and fed through the injection box 110, the optional cooling box 120, the first die 130, and the second die 140. The fibrous material 32 is then coupled to the puller 150.

Next, in Step 310, the rollers 152A and 152B of the puller 150 are activated/actuated to rotate in opposite directions at a preset rotational speed. Accordingly, as illustrated in FIG. 2, the roller 152A rotates in a counterclockwise direction, while the roller 152B rotate in a clockwise direction, therein to pulling the fibrous material 32 from the fibrous material rollers 105 such that the fibrous material 32 travels consecutively through the injection box 110, the optional cooling box 120, the first die 130, an intermediate region 137, and the second die 140 prior to reaching the puller 150. The preset rotational speed of the rollers 152A, 152B provides a desired translational speed of the fibrous material 32 (shown as traveling left to right as illustrated in FIG. 2). Preferably, the translational speed of the fibrous material 32 proceeds at a rate of from 30 to 250 centimeters per second through the injection box 110, the optional cooling box 120, the first die 130, and the second die 140. In conjunction therewith, the puller 150 pulls the fibrous material 32 at a pull force of less than 4000 pounds force (about 17,800 Newtons), such as from 1,600 to 4,000 pounds force (from about 7,000 Newtons to 17,800 Newtons).

In Step 315, a resin-infused fibrous material 70 is formed. In this Step, a liquid resin component 60 is introduced onto the fibrous material 32 traveling through the injection box 110 from the feed system 160 to form the resin-infused fibrous material 70. More specifically, the liquid resin component 60 is applied such that the fibrous material 32 is at least partially impregnated with and at least partially surrounded by the liquid resin component 60. As the liquid resin component 60 impregnates and surrounds the fibrous material 32, the isocyanate-functional groups of the isocyanate component begin to react with the hydroxyl-functional groups of the isocyanate-reactive component to form carbamate linkages (i.e., the liquid resin component 60 begins curing or crosslinking), which increases the viscosity of the liquid resin component 60 as the amount of crosslinking increases, thus forming the resin-infused fibrous material 70.

Next, in Step 320, the resin-infused fibrous material 70 (i.e., the fibrous material 32 having the applied liquid resin component 60) exits the injection box 110 and optionally travels through the cooling box 120, wherein the isocyanate-functional groups of the isocyanate component continue to react with the hydroxyl-functional groups of the isocyanate-reactive component to form additional carbamate linkages in the resin-infused fibrous material 70.

In Step 325, the resin-infused fibrous material 70 exits the injection box 110, or the cooling box 120 if present, and travels into the first die 130. Within the first die 130, the resin-infused fibrous material 70 is heated to a first temperature and for a first time sufficient within the first zone 132 to partially-cure the liquid resin component 60 applied to the fiber-reinforced fibrous material 70 and form a partially-cured fibrous material 80.

In certain embodiments, the first die 130 is heated to a temperature of between 150 and 190 degrees Celsius.

The partially-cured fibrous material 80, as defined herein, is a material having sufficient curing such that the outer surface of the material is tacky to the touch, and has increased viscosity relative to the less viscous material of the resin-infused fibrous material 70 exiting the cooling zone 120 and injection box 110, respectively. As alternatively defined herein and/or collectively further defined herein, a "partially-cured" material also has a degree of crosslinking (i.e., degree of curing) of from about 50% to about 75% of the available NCO groups contributed from the isocyanate component, or alternatively from about 50% to about 75% of the available hydroxyl-groups from the isocyanate reactive component.

In Step 330, the partially-cured fibrous material 80 is pushed through the exit opening 133 of the first die 130 and into the intermediate region 137. In this Step, the outer profile surface 81 of the partially-cured fibrous material 80 is formed to correspond to the profile of the exit opening 133 of the first die 130.

In Step 335, the one or more layers of the polymer layer 40 are unrolled and applied onto at least a portion of the outer profile surface 81 of the partially-cured fibrous material 80 within the intermediate region 137. The tackiness of the partially-cured outer profile surface 81 aids in adhering the innermost one 40A of the polymer layer 40 layers at least to a portion of the outer profile surface 81 of the partially-cured fibrous material 80.

In an alternative embodiment, as opposed to unrolling the one or more layers of polymer layer 40 and applying these layers 40 onto at least a portion of the outer profile surface 81 as described in Step 335, the polymer layer 40 can be formed and applied in a single manufacturing step. By way of example, each of the components used in the polymeric material used for forming the polymer layer 40 can be introduced to a conventional extruder and extruded as a single layer of the polymer layer 40 onto at least a portion of the outer profile surface 81 of the partially-cured fibrous material 80 within the intermediate region 137.

In Step 340, the partially-cured fibrous material 80 having the applied polymer layer 40 enters the second die 140. Within the second die 140, the partially-cured fibrous material 80 and applied polymer layer 40 are heated to a second temperature and for a second time sufficient to further cure the liquid resin component 60 such that it is "substantially-cured" to form a fiber-reinforced thermoset core material 30 having the thermoset material 34, wherein the applied polymer layer 40 is adhered onto an outer surface 35 of the fiber-reinforced thermoset core material 30, thereby forming the multi-layered structure 20.

The term "substantially-cured", as defined herein, is a material having sufficient curing such that the outer surface of the material is not tacky to the touch, and has increased viscosity and hardness relative to a "partially-cured" fibrous material 80 described above. As alternatively defined herein and/or collectively further defined herein, a "substantially-cured" material also has a degree of crosslinking (i.e., degree of curing) of greater than about 75% of the available NCO groups contributed from the isocyanate component, or alternatively greater than about 75% of the available hydroxyl-groups from the isocyanate reactive component. Accordingly, the degree of curing of the thermoset material 34 of the fiber-reinforced thermoset core material 30 can be defined as a "substantially cured" material when its degree of curing is greater than the corresponding degree of curing of the liquid resin component in the partially-cured fibrous material 80 described above. Still further, the outer surface 35 of the fiber-reinforced thermoset core material 30, including portions defined by the thermoset material 34, are not tacky to the touch as defined by the "substantially cured" material, whereas the corresponding outer surface of the partially-cured fibrous material 80 is tacky to the touch.

As noted previously, the second die 140 includes a first zone 143 and a second zone 144. The first zone 143 is positioned adjacent to entrance opening 141 wherein the partially-cured fibrous material 80 having the applied polymer layer 40 enters the second die 140, and includes a platen 146 that heats the first zone 143 to a desired temperature sufficient to substantially cure the liquid resin component 60. The second zone 143 is positioned adjacent to the exit opening 143 and includes a platen 147 that heats the second zone 144 to a desired temperature to post cure the substantially-cured liquid resin component 60.

In certain embodiments, the first zone 143 and second zone 144 of the second die 140 are each heated, respectively, to a temperature of between 170 and 210 degrees Celsius. In certain of these embodiments, the temperature of the first zone 143 is different from the temperature of the second zone 144. In further embodiments, the temperature of the first zone 143 is less than the temperature of the second zone 144, while in alternative further embodiments the temperature of the second zone 144 is lees than the temperature of the first zone 143.

In still further embodiments, the temperatures in first zone 143 and second zone 144 of the second die 140 are greater than the temperatures utilized in the first die 130 so as to ensure substantial curing of the fiber-reinforced thermoset core material 30. Alternatively, the temperatures in first zone 143 and second zone 144 of the second die 140 may be the same as, or less than, than the temperatures utilized in the first die 130, but sufficient to ensure continued curing of the resin component of the partially-cured fibrous material 80 to form the fiber-reinforced thermoset core material 30.

In Step 345, the multi-layered structure 20 exits the second die 140 through the exit opening 142. In certain embodiments, the multi-layered structure 20 is formed to a desired outer profile shape corresponding to the outer profile shape of the exit opening 142.

Finally, in Step 350, the multi-layered structure 20 may be cut to a desired length by the cutting device 160.

The subject invention has been described in an illustrative manner. It is to be understood that the terminology, which has been used, is intended to be in the nature of words of description rather than of limitation.

Many modifications and variations of the subject invention are possible in light of the above teachings. Therefore, within the scope of the appended claims, the subject invention may be practiced other than as specifically described.

What is claimed is:

1. A method for forming a multi-layered structure comprising:
   pulling a fibrous material consecutively through an injection box, an optional cooling box, a first die, and a second die of a multi-die pultrusion device, wherein the first die and the second die are separated by an intermediate region;
   forming a resin-infused fibrous material by introducing a liquid resin component onto the fibrous material within the injection box such that the fibrous material is at least partially impregnated with and at least partially surrounded by the liquid resin component;
   forming a partially-cured fiber-reinforced core material by heating the resin-infused fibrous material to a first temperature and for a first time sufficient to partially cure the liquid resin component within the first die of the multi-die pultrusion device;

shaping the partially-cured fiber-reinforced core material to an outer profile shape while removing the partially-cured fiber-reinforced core material from the first die by pulling the partially-cured fiber-reinforced core material through a die opening in the first die and into the intermediate region between the first die and the second die;

applying one or more layers of a polymer material onto at least a portion of the outer profile surface of the partially-cured fiber-reinforced core material within the intermediate region between the first die and the second die; and introducing the partially-cured fiber-reinforced core material having the applied one or more layers into the second die and heating the partially-cured fiber-reinforced core material having the applied one or more layers to a second temperature and for a second time sufficient to substantially cure the liquid resin component and form a fiber-reinforced thermoset core material, wherein one of the applied one or more layers is adhered onto an outer surface of the fiber-reinforced thermoset core material, thereby forming the multi-layered structure, wherein the second die includes a first heating zone and a second heating zone, wherein the first heating zone substantially cures the liquid resin component and wherein the second heating zone post cures the liquid resin component, the partially-cured fiber-reinforced core material having the applied polymer film is heated to a temperature of from 170 to 210 degrees Celsius within the first heating zone, and the partially-cured fiber-reinforced core material having the applied polymer film is heated to a temperature of from 170 to 210 degrees Celsius within the second heating zone, the temperature of the first heating zone being different than the temperature of the second heating zone.

2. The method of claim 1, wherein the liquid resin component comprises an isocyanate component and an isocyanate-reactive component, wherein the isocyanate component has isocyanate functional groups and wherein the isocyanate-reactive component has functional groups reactive with the isocyanate-functional groups.

3. The method of claim 2, wherein the multi-die pultrusion device includes a resin injection system for applying the liquid resin component onto the fibrous material within the injection box, and wherein the isocyanate component and isocyanate-reactive component are premixed in the resin injection system to form the liquid resin component prior to the liquid resin component being applied onto the fibrous substrate in the injection box.

4. The method according to claim 1, wherein the resin-infused fibrous material is heated to a temperature of from 150 to 190 degrees Celsius within the first die.

5. The method according to claim 1, wherein the fibrous material is pulled consecutively through the injection box, an optional cooling box, the first die, and the second die of the multi-die pultrusion device at a rate of 30 to 250 centimeters per second.

6. The method according to claim 1, wherein the resin-infused fibrous material is cooled within a cooling box located between the injection box and the first die.

7. The method according to claim 1, wherein the one or more layers of the polymer material is unrolled from a roller and applied onto at least a portion of the outer profile surface of the partially-cured fiber-reinforced core material within the intermediate region.

8. The method of claim 1, wherein the fibrous material is selected from the group consisting of a continuous fiber roving, a non-woven fiber mat, a woven fiber mat, and a random fiber mat.

9. The method according to claim 1, wherein the polymer layer is a thermoplastic polymer layer.

10. The method of claim 1, wherein the polymer layer comprises a ultraviolet-light blocking polymer layer.

11. The method of claim 1, wherein the polymer material of the applied one or more layers is selected from PET, a PBT, and TPU.

12. The method of claim 1, wherein the applied one or more layers of a polymer material comprises at least two applied layers of the polymer material, wherein the composition of the polymer material each one of said at least two applied layers is the same or different from the adjacent applied layer of the polymer material.

13. A method for forming a multi-layered structure comprising:

pulling a fibrous material consecutively through an injection box, a cooling box, a first die, and a second die of a multi-die pultrusion device, wherein the first die and the second die are separated by an intermediate region;

forming a resin-infused fibrous material by introducing a liquid resin component onto the fibrous material within the injection box such that the fibrous material is at least partially impregnated with and at least partially surrounded by the liquid resin component;

forming a partially-cured fiber-reinforced core material by heating the resin-infused fibrous material to a first temperature and for a first time sufficient to partially cure the liquid resin component within the first die of the multi-die pultrusion device;

shaping the partially-cured fiber-reinforced core material to an outer profile shape while removing the partially-cured fiber-reinforced core material from the first die by pulling the partially-cured fiber-reinforced core material through a die opening in the first die and into the intermediate region between the first die and the second die;

applying one or more layers of a polymer material onto at least a portion of the outer profile surface of the partially-cured fiber-reinforced core material within the intermediate region between the first die and the second die; and introducing the partially-cured fiber-reinforced core material having the applied one or more layers into the second die and heating the partially-cured fiber-reinforced core material having the applied one or more layers to a second temperature and for a second time sufficient to substantially cure the liquid resin component and form a fiber-reinforced thermoset core material, wherein one of the applied one or more layers is adhered onto an outer surface of the fiber-reinforced thermoset core material, thereby forming the multi-layered structure, wherein the resin-infused fibrous material is cooled within a cooling box located between the injection box and the first die.

14. A method for forming a multi-layered structure comprising:
- pulling a fibrous material consecutively through an injection box, an optional cooling box, a first die, and a second die of a multi-die pultrusion device, wherein the first die and the second die are separated by an intermediate region;
- forming a resin-infused fibrous material by introducing a liquid resin component onto the fibrous material within the injection box such that the fibrous material is at least partially impregnated with and at least partially surrounded by the liquid resin component;
- forming a partially-cured fiber-reinforced core material by heating the resin-infused fibrous material to a first temperature and for a first time sufficient to partially cure the liquid resin component within the first die of the multi-die pultrusion device;
- shaping the partially-cured fiber-reinforced core material to an outer profile shape while removing the partially-cured fiber-reinforced core material from the first die by pulling the partially-cured fiber-reinforced core material through a die opening in the first die and into the intermediate region between the first die and the second die;
- applying one or more layers of a polymer material onto at least a portion of the outer profile surface of the partially-cured fiber-reinforced core material within the intermediate region between the first die and the second die; and
- introducing the partially-cured fiber-reinforced core material having the applied one or more layers into the second die and heating the partially-cured fiber-reinforced core material having the applied one or more layers to a second temperature and for a second time sufficient to substantially cure the liquid resin component and form a fiber-reinforced thermoset core material, wherein one of the applied one or more layers is adhered onto an outer surface of the fiber-reinforced thermoset core material, thereby forming the multi-layered structure,
- wherein the applied one or more layers of a polymer material comprises at least two applied layers of the polymer material, wherein the composition of the polymer material each one of said at least two applied layers is the same or different from the adjacent applied layer of the polymer material.

\* \* \* \* \*